(12) United States Patent
Mendez et al.

(10) Patent No.: US 11,215,732 B2
(45) Date of Patent: Jan. 4, 2022

(54) GEOLOGICAL CONSTRAINT USING PROBABILITY FUNCTIONS IN STOCHASTIC MINERALOGY MODELING

(71) Applicant: Baker Hughes, a GE company, LLC, Houston, TX (US)

(72) Inventors: Freddy Mendez, Kingwood, TX (US); Hao Zhang, Spring, TX (US); John Longo, Houston, TX (US); Eliseo Rodriguez, Austin, TX (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 433 days.

(21) Appl. No.: 16/138,199

(22) Filed: Sep. 21, 2018

(65) Prior Publication Data
US 2019/0094410 A1    Mar. 28, 2019

Related U.S. Application Data

(60) Provisional application No. 62/562,970, filed on Sep. 25, 2017.

(51) Int. Cl.
*G01V 5/12* (2006.01)
*E21B 49/00* (2006.01)
(Continued)

(52) U.S. Cl.
CPC .............. *G01V 5/12* (2013.01); *E21B 49/00* (2013.01); *G01V 5/145* (2013.01); *E21B 49/08* (2013.01)

(58) Field of Classification Search
CPC .......... G01V 5/12; G01V 5/145; E21B 49/00; E21B 49/08
See application file for complete search history.

(56) References Cited

U.S. PATENT DOCUMENTS

| | | | |
|---|---|---|---|
| 3,321,625 A | 5/1967 | Wahl | |
| 3,566,177 A | 2/1971 | Daniel | |
| (Continued) | | | |

FOREIGN PATENT DOCUMENTS

WO    2012015542 A1    2/2012

OTHER PUBLICATIONS

Mayer, C. et al., "Global, A New Approach To Computer-Processed Log Interpretation," Society of Petroleum Engineers, Source SPE-9341-MS, SPE Annual Technical Conference and Exhibition, Sep. 21-24, Dallas, Texas, 1980.
(Continued)

*Primary Examiner* — Tarun Sinha
*Assistant Examiner* — Yossef Korang-Beheshti
(74) *Attorney, Agent, or Firm* — Cantor Colburn LLP

(57) ABSTRACT

Methods and devices for estimating at least one property of a volume of interest of an earth formation from a radiation based measurement. Methods include using an optimization procedure to determine an optimal mineralogical model in dependence upon a secondary dependence relation between tool measurements, the mineralogical model including a mineralogical composition of the volume. The secondary dependence relation may include a relation between a plurality of estimated elemental concentrations for the volume. The mineralogical composition may include a concentration of each mineral of a plurality of minerals of the volume. The relation may include a ratio of a first elemental concentration of the plurality of estimated elemental concentrations and a second elemental concentration of the plurality of estimated elemental concentrations. Methods may include using at least one cost function to determine the optimal mineralogical model, wherein the at least one cost function is determined using the relation.

14 Claims, 7 Drawing Sheets

(51) Int. Cl.
*E21B 49/08* (2006.01)
*G01V 5/14* (2006.01)

(56) References Cited

U.S. PATENT DOCUMENTS

| | | | |
|---|---|---|---|
| 4,390,783 | A | 6/1983 | Grau |
| 4,570,067 | A | 2/1986 | Gadeken |
| 4,810,459 | A | 3/1989 | Fontenot |
| 4,910,397 | A | 3/1990 | Mills, Jr. et al. |
| 5,684,299 | A | 11/1997 | Dasgupta |
| 5,789,752 | A | 8/1998 | Mickael |
| 6,896,056 | B2 | 5/2005 | Mendez et al. |
| 7,205,535 | B2 | 4/2007 | Madigan et al. |
| 7,403,000 | B2 | 7/2008 | Barolak et al. |
| 7,525,872 | B2 | 4/2009 | Tang et al. |
| 7,787,327 | B2 | 8/2010 | Tang et al. |
| 7,795,864 | B2 | 9/2010 | Barolak et al. |
| 8,055,448 | B2 | 11/2011 | Mathiszik et al. |
| 8,061,206 | B2 | 11/2011 | Bolshakov et al. |
| 8,311,744 | B2 | 11/2012 | Khisamutdinov et al. |
| 8,788,207 | B2 | 7/2014 | Pei et al. |
| 8,811,114 | B2 | 8/2014 | Geerits et al. |
| 9,103,196 | B2 | 8/2015 | Zhao et al. |
| 9,341,737 | B2 | 5/2016 | Inanc et al. |
| 2008/0162093 | A1 | 7/2008 | Nivlet et al. |
| 2008/0221800 | A1* | 9/2008 | Gladkikh ............. G01V 5/04 702/11 |
| 2009/0254283 | A1* | 10/2009 | Jacobi ............... G01V 11/00 702/11 |
| 2011/0246157 | A1 | 10/2011 | Pauget et al. |
| 2012/0010819 | A1* | 1/2012 | Ansari ............... G01V 5/10 702/8 |
| 2012/0215513 | A1 | 8/2012 | Branets et al. |
| 2012/0298420 | A1* | 11/2012 | Seydoux ............. E21B 47/02 175/26 |
| 2013/0262052 | A1 | 10/2013 | Mallet et al. |
| 2014/0019049 | A1 | 1/2014 | Dorovsky et al. |
| 2014/0197324 | A1* | 7/2014 | Mendez ............. G01V 5/12 250/395 |
| 2014/0214324 | A1* | 7/2014 | Freedman ........... G01V 5/08 702/8 |
| 2014/0222403 | A1 | 8/2014 | Lepage et al. |
| 2016/0266275 | A1* | 9/2016 | Akkurt ............... E21B 49/00 |
| 2017/0102479 | A1 | 4/2017 | Kouchmeshky et al. |

OTHER PUBLICATIONS

Mitchell, K., "A Practical Approach To Statistical Log Analysis," Sun Exploration and Production Company, SPWLA 29th Annual Logging Symposium, Jun. 5-8, 1988, San Antonio, Texas Publication.

Rodriguez, E., "Estimating Rock Properties by Statistical Methods," SPE-17603-MS Publisher Society of Petroleum Engineers Source International Meeting on Petroleum Engineering, Nov. 1-4, Tianjin, China Publication Date 1988.

Doveton, John H. "Statistical Methods For Log Analysis of Reservoir Properties: Chapter 1" (1994): 1-22.

* cited by examiner

GEOLOGICAL CONSTRAINT USING PROBABILITY FUNCTIONS IN STOCHASTIC MINERALOGY MODELING

CROSS-REFERENCE TO RELATED APPLICATIONS

This application claims priority from U.S. Ser. No. 62/562,970, filed Sep. 25, 2017, the entire disclosure of which is incorporated herein by reference in its entirety.

FIELD OF THE DISCLOSURE

In one aspect, this disclosure generally relates to methods, devices and systems for estimating at least one parameter of interest of an earth formation using nuclear radiation based measurements.

BACKGROUND OF THE DISCLOSURE

Using electrical, acoustic, and nuclear techniques to investigate an earth formation is well known. For example, nuclear well logging systems have been utilized in hydrocarbon exploration for many years. In many these nuclear well logging systems, reliance is made upon the physical phenomenon that the energy of gamma rays given off by nuclei resulting from natural radioactive decay or induced nuclear radiation are indicative of the presence of certain elements within the formation. For example, naturally radioactive elements are commonly found in earth formations in various proportions. Radioactive isotopes of potassium, uranium, and thorium are typical regularly occurring naturally radioactive elements. Thus, radiation detected at an instrument in the borehole is indicative of various formation properties, including information about the elements contained within an earth formation and the minerals of the formation in which these elements are contained.

A rigid or non-rigid conveyance device is often used to convey one or more nuclear radiation detectors or other sensors into a borehole intersecting the earth formation, often as part of a tool or a set of tools. There, the sensors(s) may be used to estimate physical phenomena (e.g., radiation) associated with an earth formation by generating a response at the sensor, such as, for example, a response to the one or more types of nuclear radiation present in the near-borehole environment during measurement for a radiation detector. This response may then be used to estimate a parameter of interest of the formation. In nuclear logging, additional radioactive isotopes may be generated by providing radiation (e.g., neutron bombardment) to the formation.

Well logging systems have been utilized in hydrocarbon exploration for many years. Such systems provide data for use by geologists and petroleum engineers in making many determinations pertinent to hydrocarbon exploration. In particular, these systems provide data for defining the elements, minerals, or lithology of subsurface formations which may be used in identifying hydrocarbon-productive zones, subsurface structural mapping, and generating operational procedures to be executed for the formation.

SUMMARY OF THE DISCLOSURE

In aspects, the present disclosure is related to methods and apparatuses for estimating at least one parameter of interest of an earth formation using nuclear radiation based measurements.

Aspects may include methods, systems, and devices for estimating at least one property of a volume of interest of an earth formation from a radiation based measurement. Methods include using an optimization procedure to determine an optimal mineralogical model in dependence upon a secondary dependence relation between tool measurements, the mineralogical model including a mineralogical composition of the volume. The secondary dependence relation may use various measurements such as acoustic, NMR, and core measurements. The secondary dependence relation may include a relation between a plurality of estimated elemental concentrations for the volume. The mineralogical composition may include a concentration of each mineral of a plurality of minerals of the volume. The relation may include a ratio of a first elemental concentration of the plurality of estimated elemental concentrations and a second elemental concentration of the plurality of estimated elemental concentrations. Methods may include using at least one cost function to determine the optimal mineralogical model, wherein the at least one cost function is determined using the relation. The at least one cost function may be determined in dependence upon a probability function.

The ratio of the first elemental concentration and the second elemental concentration may be used to constrain a mineral that lacks both the element of the first elemental concentration and the element of the second elemental concentration. Methods may include selecting the optimal mineralogical model from a plurality of candidate models. Methods may include deconvolving a response spectrum to estimate the plurality of estimated elemental concentrations for the volume, obtaining the response spectrum for the volume of interest, and/or conducting further operations in the formation in dependence upon the optimal mineralogical model. Obtaining the response spectrum for the volume of interest may include making a gamma ray measurement using a gamma ray tool.

Further operations may comprise at least one of: i) geosteering; ii) drilling at least one borehole in the formation; iii) performing measurements on the formation; iv) estimating at least one parameter of interest of the formation; v) installing equipment in a borehole in the formation; vi) evaluating the formation; vii) optimizing development in the formation; viii) optimizing development in a formation related to the formation; ix) optimizing exploration in the formation; x) optimizing exploration in a formation related to the formation; xi) producing at least one hydrocarbon from the formation.

Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
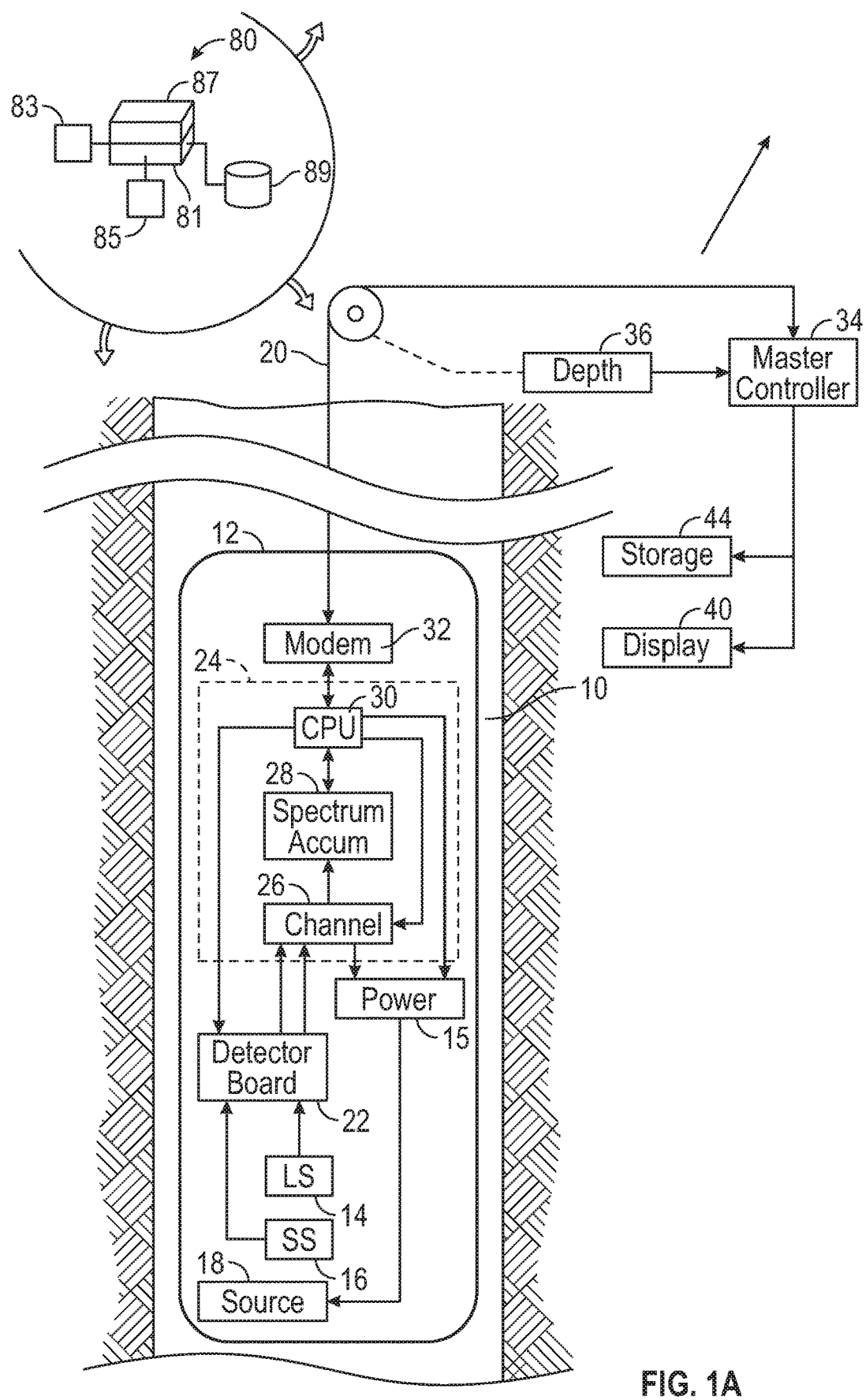
FIG. 1A illustrates a well logging configuration in accordance with embodiments of the present disclosure.

Aspects of the present disclosure include methods for estimating at least one property of an earth formation from sensor measurements using estimates of elemental concentration. The formation of interest may surround a borehole intersecting the earth formation. This property, or parameter of interest, may include a mineral property of the formation, such as an amount of a particular mineral in the sample volume of the formation ('mineral concentration'), a fractional portion of the sample volume occupied by a particular mineral ('volume fraction'), and so on. The parameter of interest may also be a lithology classification.

Estimation of mineralogical properties of the formation from radiation based measurements, acoustic measurements, electrical measurements, core measurements, and nuclear magnetic resonance ('NMR') is desirable but historically problematic. Conversion of radiation measurement information into mineralogical properties conventionally relies on statistical methods to apportion measurement phenomena to candidate minerals. Stochastic mineralogy modeling, for example, typically involves solving for those mineral compositions that yield the smallest errors. However, a certain amount of measurement error is typically present. Thus, when considered in context, a particular mineral composition devised with these traditional techniques may be internally or externally geologically inconsistent. That is, in a particular case, the solution having the lowest error may not make sense geologically, while a nearby solution with a slightly larger error may substantially represent the actual formation properties. This slightly larger error is compensated by its more geologically sound result.

Aspects of the present disclosure include techniques for geological constraint of the solution by representing the geological or physical relations between the unknowns in the mineralogy model in order to provide geological guidance to the solution. Methods include using an optimization procedure to determine an optimal mineralogical model in dependence upon a relation between a plurality of estimated elemental concentrations for the formation. The mineralogical model may include a mineralogical composition of the sample volume. The mineralogical composition may include a concentration of each mineral of a plurality of minerals of the sample volume.

An energy spectrum incident on an instrument in a borehole and produced from radioactive decay of radionuclides within a volume of interest of an earth formation may be used to estimate parameters of interest of the formation. The energy spectrum may be expressed in terms of magnitude (e.g., gamma ray counts per period of time) as a function of energy. The radioactive decay of radionuclides may produce nuclear radiation that may be detected by radiation detectors. Radionuclides may include naturally occurring radionuclides, such as potassium-40, and the uranium and thorium series, which exist in the earth formation and activated radionuclides, which may include radionuclides activated from the irradiation of nuclides with nuclear radiation.

One or more nuclear radiation detectors disposed along the downhole tool may be configured to generate a response indicative of the nuclear radiation detected. The detected nuclear radiation may include gamma rays and neutrons. Since the energy spectrum may include energy spectrum components from multiple radionuclides, the nuclear radiation information may be separated to identify the energy spectrum components contained with the energy spectrum.

The separate energy spectrum components may be used for estimating the concentration of at least one radionuclide in the earth formation. The estimated concentration of the at least one radionuclide may be used for estimating at least one parameter of interest of the earth formation. A description for some embodiments estimating the at least one parameter of interest follows below. The estimation may be performed in multiple stages, such that an earlier stage may process the information for a later stage. One of the stages may include a technique of elemental standards-based spectral decomposition (also known as a yields method).

Prior art methods exist for determining attributes of a formation from logging results. See, for example, U.S. Pat. No. 3,321,625 to Wahl, U.S. Pat. No. 3,566,177 to Larson, U.S. Pat. No. 4,390,783, to Grau, U.S. Pat. No. 4,570,067 issued to Gadeken, U.S. Pat. No. 4,810,459 to Fontenot, U.S. Pat. No. 4,910,397 to Mills, Jr. et al., U.S. Pat. No. 5,684,299 to DasGupta, U.S. Pat. No. 5,789,752 to Mickael et al, and U.S. Pat. No. 9,341,737 to Inanc et al., all incorporated herein by reference in their entirety.

Each of the embodiments herein may be used in a variety of settings in both drilling and non-drilling environments. In some implementations, the disclosed embodiments may be used in connection with LWD or MWD tools as part of a drilling system, while in other implementations embodiments may be incorporated into other types of well tools, such as wireline or slickline systems.

Referring now to the drawings in more detail, and particularly to FIG. 1A, there is illustrated a nuclear well logging configuration in accordance with the present invention. Well 10 penetrates the earth's surface and may or may not be cased depending upon the particular well being investigated. Disposed within well 10 is subsurface well logging instrument 12. The system diagramed in FIG. 1A is a microprocessor-based nuclear well logging system using multi-channel scale analysis for determining the timing distributions of the detected gamma rays. Well logging instrument 12 includes long-spaced (LS) detector 14, short-spaced (SS) detector 16 and pulsed neutron source 18. In an exemplary embodiment, LS and SS detectors 14 and 16 may be comprised of LYSO ($Lu_{1-x}Y_xSi_2O_5$) crystals coupled to photomultiplier tubes. In other examples, crystals of CsI (Na), NaI(Tl), BGO or GSO may be used, or joined fiber materials may be employed which are made up of fibers comprising crystalline scintillation materials (e.g., LuAG and YAG), amorphous glass, nanostructured glass ceramics, and so on.

To protect the detector systems from the high temperatures encountered in boreholes, the detector system may be mounted in a Dewar-type flask. Also, in an exemplary embodiment, source 18 comprises a pulsed neutron source using a D-T reaction wherein deuterium ions are accelerated into a tritium target, thereby generating neutrons having an energy of approximately 14 MeV. The filament current and accelerator voltage are supplied to source 18 through power supply 15. Cable 20 suspends instrument 12 in well 10 and contains the required conductors for electrically connecting instrument 12 with the surface apparatus.

The outputs from LS and SS detectors 14 and 16 are coupled to detector board 22, which amplifies these outputs and compares them to an adjustable discriminator level for passage to channel generator 26. Channel generator 26 converts the output pulse heights to digital values, which are accumulated into pulse height spectra, in which the pulses are sorted according to their amplitudes into a discrete array of bins. The bins uniformly divide the entire amplitude range. These pulse height spectra are accumulated in registers in the spectrum accumulator 28, the spectra being sorted according to their type: inelastic, capture, or background. After a pulse height spectrum has been accumulated, CPU 30 controls the transfer of the accumulated data to the modem 32, which is coupled to cable 20 for transmission of the data over a communication link to the surface apparatus. To be explained later are further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. An input terminal may be coupled to master controller or processor 34 to allow the system operator to provide selected input into master controller 34 for the logging operation to be performed by the system. Display unit 40, and storage unit 44 coupled to the master controller 34 may be provided. The data may also be sent by a link to a remote location. Processing may be done either by the surface processor, at the remote site, or by a downhole processor.

Master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 10,000 bursts/second (10 kHz). This, in turn, causes a burst of high-energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 14 and 16. As each gamma ray thus impinges upon the crystal-photomultiplier tube arrangement of the detectors, a voltage pulse having an amplitude functionally related to the energy of the particular gamma ray is delivered to detector board 22. Detector board 22 amplifies each pulse and compares them to an adjustable discriminator level, typically set at a value corresponding to approximately 100 keV. If such pulse has an amplitude corresponding to an energy of at least approximately 100 keV, the voltage pulse is transformed into a digital signal and passed to channel generator 26 of MCS section 24.

Figure 1B:
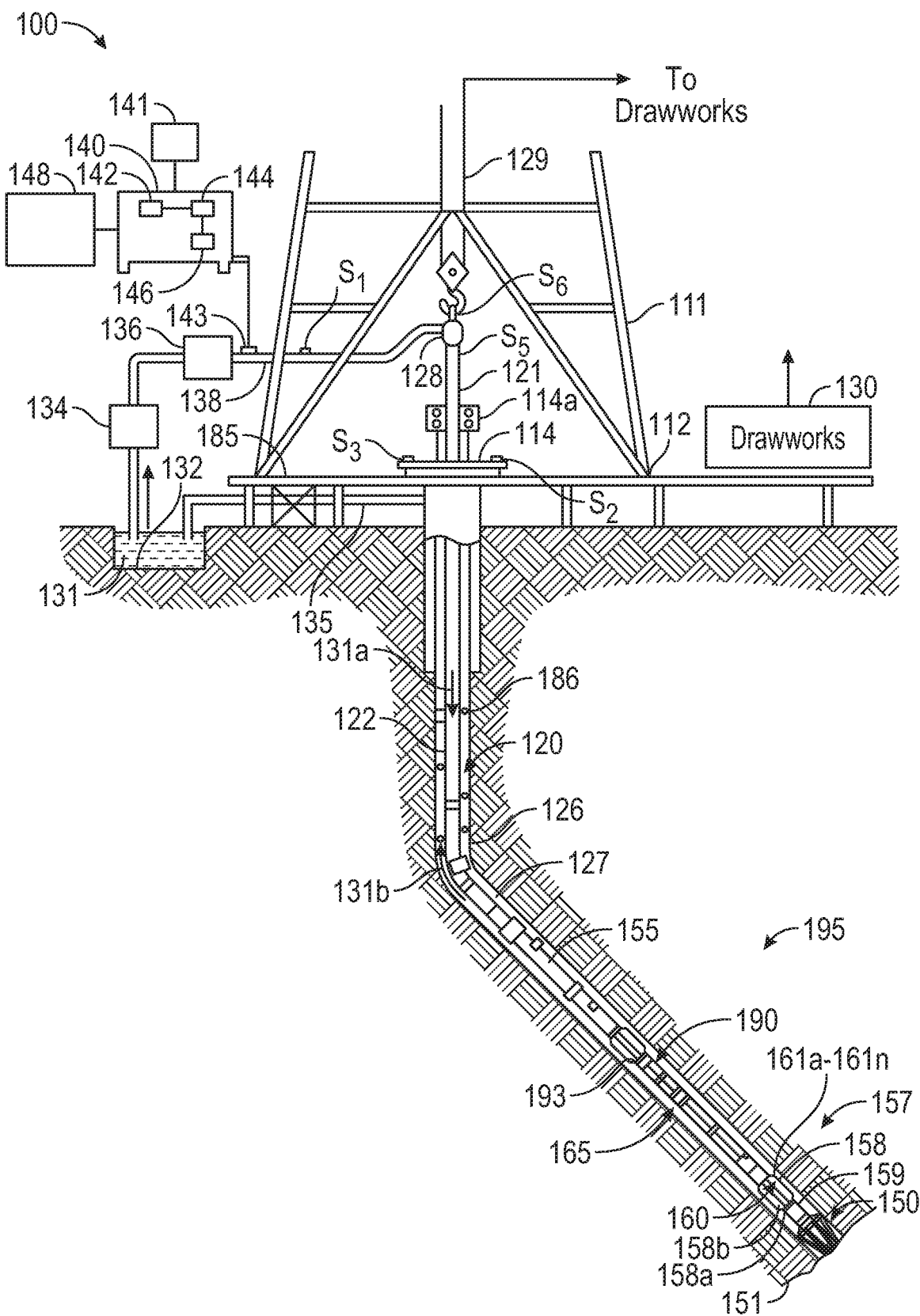
FIG. 1B is a schematic diagram of an exemplary drilling system in accordance with embodiments of the present disclosure.

FIG. 1B is a schematic diagram of an exemplary drilling system 100 that includes a drill string having a drilling assembly attached to its bottom end that includes a steering unit according to one embodiment of the disclosure. FIG. 1B shows a drill string 120 that includes a drilling assembly or bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The rate of penetration (ROP) for a given BHA largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include a variety of other sensors and devices 159 for determining one or more properties of the BHA 190 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The drilling system 100 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by Baker Hughes, a GE company.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 100 may include a bottomhole assembly and/or sensors and equipment for implementation of embodiments of the present disclosure on either a drill string or a wireline. A point of novelty of the system illustrated in FIG. 1B is that the surface processor 142 and/or the downhole processor 193 are configured to perform certain methods (discussed below) that are not in prior art.

Figure 2:
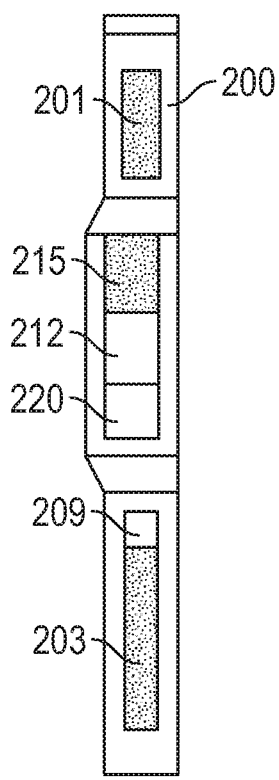
FIG. 2 illustrates a schematic diagram of an instrument suitable for use with the present invention.

FIG. 1A, there is illustrated a nuclear well logging configuration in accordance with the present invention. FIG. 1B is a schematic diagram of an exemplary drilling system 100 that includes a drill string having a drilling assembly attached to its bottom end that includes a steering unit according to one embodiment of the disclosure. FIG. 2 illustrates a schematic diagram of an instrument suitable for use with the present invention. The Formation Lithology Explorer™ ('FLEX') is a wireline instrument designed to provide formation mineralogical information, shale identification, and clay typing. The enhanced mineralogical data obtained from the FLEX also enables enhanced porosity measurements. The present invention is usable in open-hole wireline logging systems, and can also be used in LWD and cased-hole logging systems. In a typical embodiment, the present invention uses the ECLIPS™ acquisition system of Baker Hughes, a GE company. Alternatively, the present invention can be used, for example, with the FOCUS system of Baker Hughes, a GE company. Also, under most conditions, the FLEX™ is run in combination with Gamma Ray/Spectralog, Neutron, and Density nuclear tools in addition to tools such as resistivity, acoustics, NMR and others.

The FLEX™ measurement device of FIG. 2 employs the principle of neutron-induced gamma ray spectroscopy. FLEX™ component parts may be encapsulated within wireline device casing 200. The neutron source of the present invention is typically a pulsed neutron source. The use of a pulsed neutron source is advantageous over the use of a chemical neutron source due to its ability to generate inelastic gamma rays over a wider range of energies. It also allows a spectrum of capture gamma rays to be generated which is free from inelastic gamma ray contamination, which can also be corrected for background activation gamma rays. Neutron source 209 discharges high-energy bursts of neutrons into the surrounding formation. The electronic pulsed neutron generator is typically operated at a rate of approximately 10,000 Hz, so that each burst takes place within a 100 microsecond window. Gamma rays produced via interaction of the discharged neutrons and the formation are detected at the scintillation detector 212 attached to acquisition and telemetry electronics 215. Power supply 201 enables the FLEX device. Electronics 203 enables the neutron source. A shield 220 attenuates the neutron flux propagating directly from the source to the detector as well as attenuating gamma rays generated within the shield.

Figure 3:
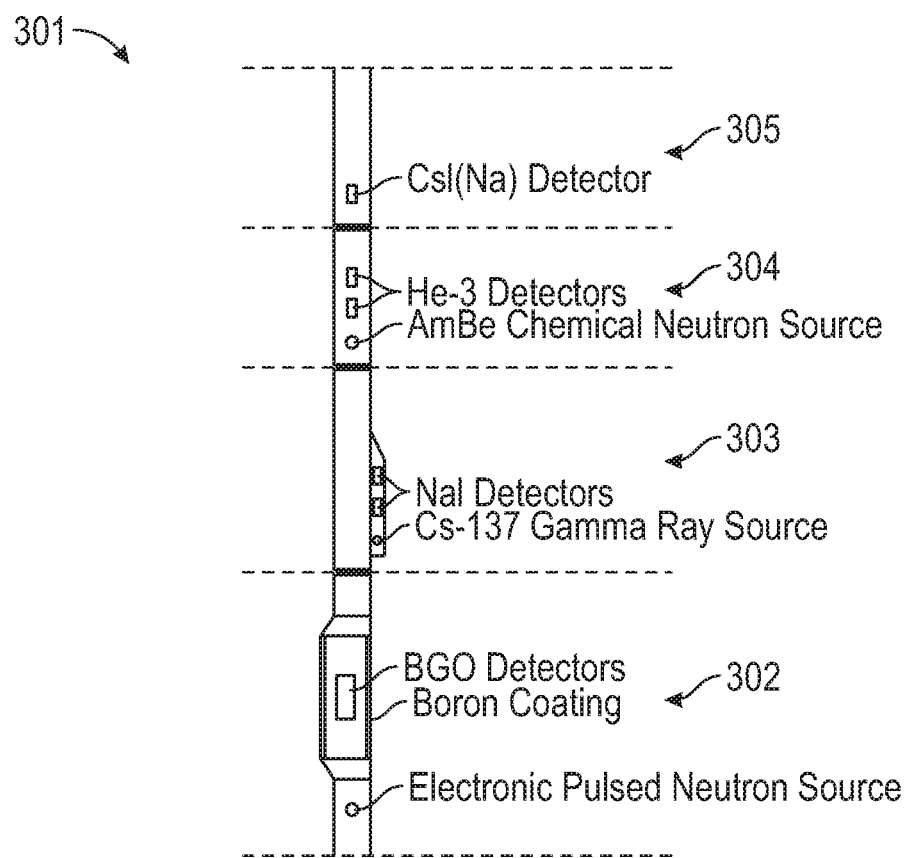
FIG. 3 illustrates exemplary components of a logging string in accordance with embodiments of the present disclosure.

FIG. 3 illustrates exemplary components of a logging string of the present disclosure. The instruments on the logging string 301 may include: a pulsed neutron tool 302 of the kind described above; a density tool 303, a natural gamma ray tool 305; and a neutron porosity tool 304. The natural gamma ray tool 305 provides data that is processed to give elemental information on Potassium (K), Thorium (Th) and Uranium (U). The pulsed neutron measurements may be analyzed to give an elemental analysis of other elements using the method discussed in U.S. Pat. No. 7,205,535 to Madigan et al., having the same assignee as the present disclosure and the contents of which are incorporated herein by reference, wherein an elemental analysis of the pulsed neutron measurements is carried out. The ensemble of tools used may be referred to as a downhole assembly.

While a wireline is shown as a conveyance system for the nuclear detection module, it should be understood that embodiments of the present disclosure may be used in connection with tools conveyed via rigid (e.g. jointed tubular or coiled tubing) as well as non-rigid (e.g. wireline, slickline, e-line, etc.) conveyance systems.

Constraint Techniques of the Present Disclosure

Aspects of the present disclosure include techniques for applying one or more geological constraints to the solution by representing the geological or physical relations between the unknowns in the mineralogy model in order to provide geological guidance to the solution.

Methods include using an optimization procedure to determine an optimal mineralogical model in dependence upon a secondary dependence relation between tool measurements. The mineralogical model may include a mineralogical composition of a sample volume of the formation. The mineralogical composition may include a concentration of each mineral of a plurality of minerals of the sample volume. The secondary dependence relation may comprise a relation between a plurality of estimated elemental concentrations for the volume.

The dependence relation can be developed on any type of tool measurement, an index, or types of ratios between two logs. As one example, a porosity measurement from an acoustic tool may be used to constrain the clay minerals by using probability functions similar to those below in FIGS. 4A & 4B. As another, the readings in a PE curve can be used to constrain carbonate minerals. Thus, any measurement or calculated index may be used to constrain mineral concentration using probability functions.

Thus, the tool may include instruments including sensors for detecting physical phenomena indicative of parameters of interest such as, for example, formation resistivity, dielectric constant, the presence or absence of hydrocarbons, acoustic velocity, bed boundary, formation density, nuclear density and certain rock characteristics, permeability, capillary pressure, relative permeability, and so on. As one example, this measurement information, produced using instrument 10a, may be used to generate a resistivity image of the borehole or another electrical parameter of interest of a formation, and additional instruments may be used to take nuclear and acoustic measurements in the borehole.

Techniques for obtaining EM propagation measurements (e.g., relative phase and attenuation) are well known in the art. See for example, U.S. patent application Ser. No. 13/991,029 to Dorovsky et al. and U.S. patent application Ser. No. 15/280,815 to Kouchmeshky et al., each incorporated herein by reference. Methods may include generating an electromagnetic (EM) field using an EM transmitter of the logging tool to produce interactions between the electromagnetic field and a volume of interest. Evaluation of the resulting measurements may be carried out in accordance with techniques known to those of skill in the art. See, for example, U.S. Pat. No. 7,403,000 to Barolak et al. and U.S. Pat. No. 7,795,864 to Barolak et al., each incorporated herein by reference in its entirety.

Acoustic beam reflection may be conventionally processed to detect azimuthal thickness of multiple tubulars (e.g., production tubing, first and second casing, etc.) as well as position, cement thickness, borehole diameter, bond quality, and so on. See, for example, U.S. Pat. No. 7,525,872 to Tang et al., U.S. Pat. No. 7,787,327 to Tang et al., U.S. Pat. No. 8,788,207 to Pei et al., U.S. Pat. No. 8,061,206 to Bolshakov, U.S. Pat. No. 9,103,196 to Zhao et al., and U.S. Pat. No. 6,896,056 to Mendez et al., each commonly owned with the present application and incorporated herein by reference in its entirety. U.S. Pat. No. 8,055,448 B2 to Mathiszik et al., having the same assignee as the present disclosure and the contents of which are incorporated herein by reference, discloses further improvements in MWD acoustic imaging. Guided borehole waves resulting from reflection of the body wave are used to image a reflector. U.S. Pat. No. 8,811,114 B2 to Geerits et al., having the same assignee as the present disclosure and the contents of which are incorporated herein by reference, discloses further improvements in MWD acoustic imaging.

The relation may include a ratio of a first elemental concentration of the plurality of estimated elemental concentrations and a second elemental concentration of the plurality of estimated elemental concentrations. The ratio of the first elemental concentration and the second elemental concentration may be used to constrain a mineral that lacks both the element of the first elemental concentration and the element of the second elemental concentration. Of course, in other instances, the elemental concentration may be used to constrain a mineral which lacks only one of the element of the first elemental concentration and the element of the second elemental concentration, or a mineral that contains both. The relation may also be expressed as an index, factor, or measurement. Methods may include selecting the optimal mineralogical model from a plurality of candidate models.

General embodiments may include using at least one cost function to determine the optimal mineralogical model, wherein the at least one cost function is determined using the relation. Some embodiments may implement these constraints as probability constraint functions. For example, the at least one cost function may be determined in dependence upon a probability function.

The following equation may be used to constrain the individual mineral fraction to a constant c:

$$F_{min,i} * \text{probability} * \text{weight} = c * \text{probability} * \text{weight}$$

The penalty weight of the cost function is dependent on the probability function used and the user-defined weight assigned to the constraint. The constant c is normally set to 0 or other small number because stochastic programs usually assign some individual minerals with an excess amount which needs constraining. Then the equation becomes:

$$F_{min,i} * probability * weight \rightarrow 0$$

This algorithm may be applied to various types of geological constraints, as shown herein below.

Figure 4A:
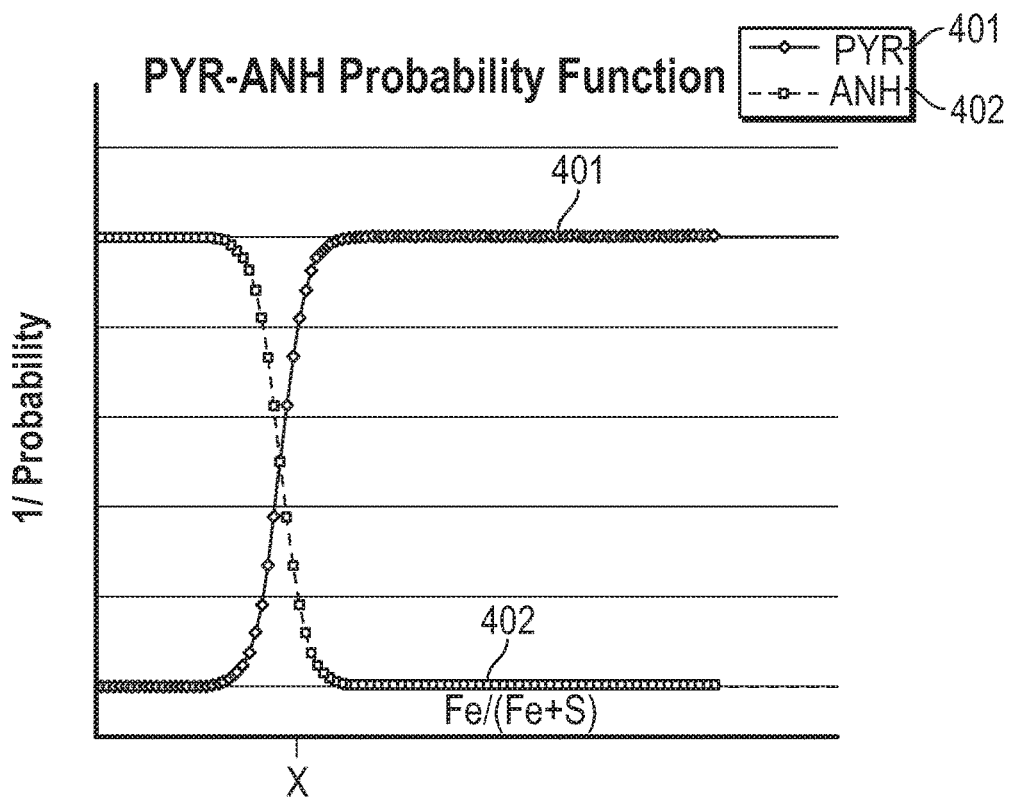
FIGS. 4A & 4B illustrate probability functions used for constraint in accordance with embodiments of the present disclosure.
Figure 4B:
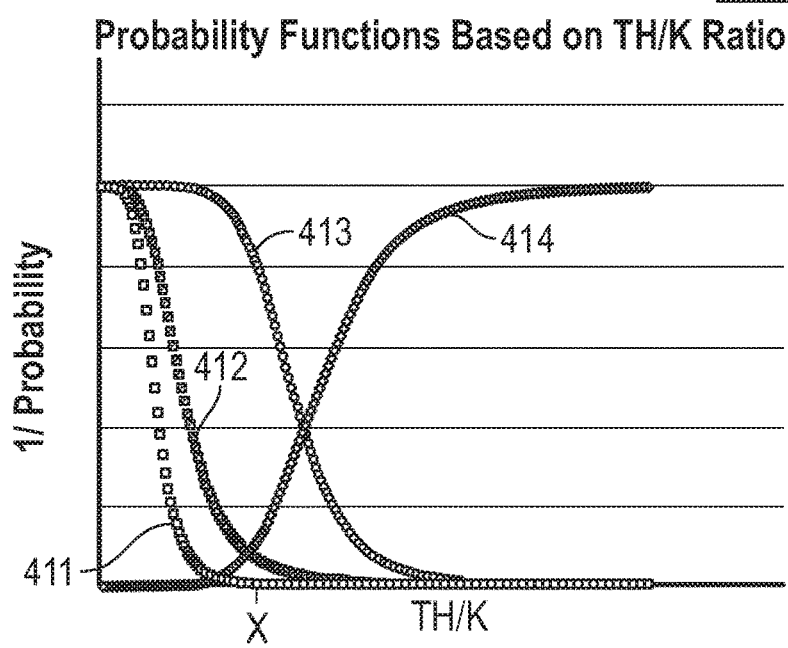

FIGS. 4A & 4B illustrate probability functions used for constraint in accordance with embodiments of the present disclosure. FIG. 4A shows a probability function for a Pyrite-Anhydrite constraint based on Fe/(Fe+S) ratio. FIG. 4B shows a probability function for a K-spar-Kaolinite-Albite-Smectite constraint based on a Thorium-Potassium ratio. The probability functions may be adjusted by the transition points and slopes. For example, in the y direction, the curves range between 0 and 1. The crossover point x in FIG. 4A may be positioned from 0.2 to 0.5 on the x axis and the crossover point x in FIG. 4B may be positioned from 5 to 15 on the x axis. The transition point controls the shifting point for probability of 50% and it can be moved along the x-axis. The slope controls the steepness of the transition between a probability of 0 and 100%. For example, probability functions in FIG. 4A demonstrate a "steeper" transition compared to the functions in FIG. 4B.

Figures 5A, 5B, 5C:
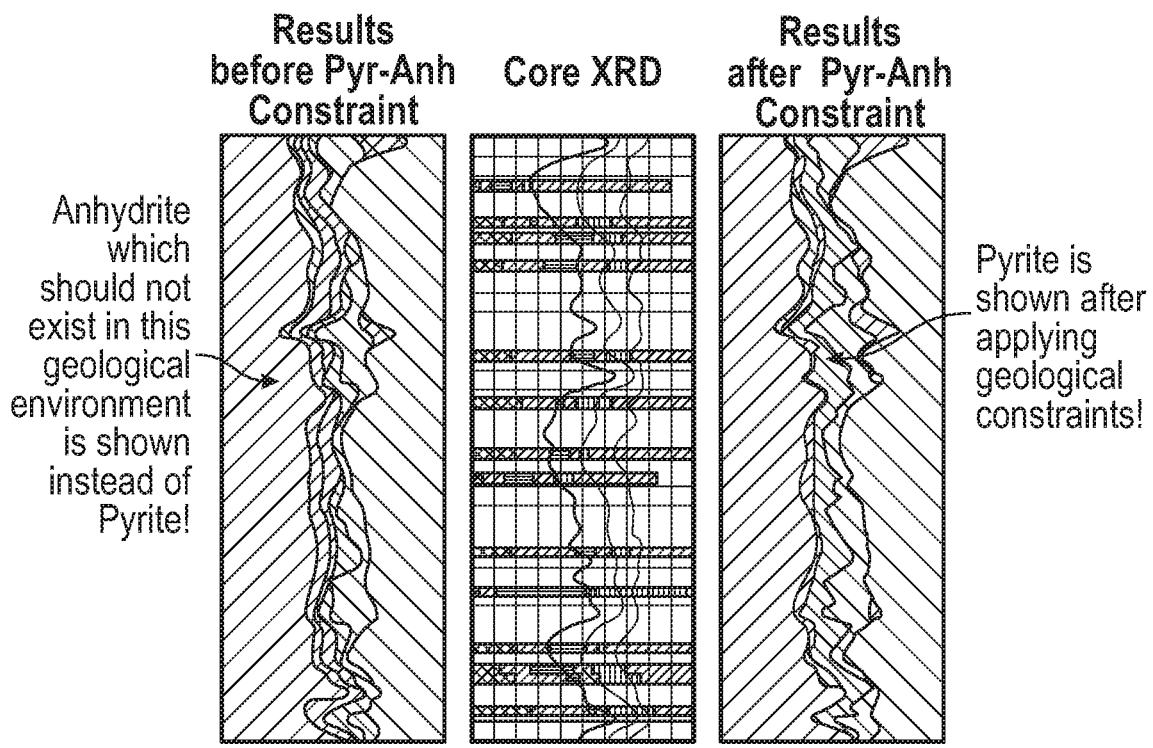
FIGS. 5A & 5C illustrate mineral results before and after applying Pyrite/Anhydrite geological constraints for a shale gas well in accordance with embodiments of the present disclosure, respectively.
FIG. 5B illustrates core measurements.

FIGS. 5A & 5C illustrate mineral results before and after applying Pyrite/Anhydrite geological constraints for a shale gas well in accordance with embodiments of the present disclosure, respectively. In FIG. 5A, anhydrite, which is less likely to exist in an organic-rich environment, is estimated as a component of the mineralogical composition. In FIG. 5C, after applying the geological constraint of FIG. 4A, anhydrite is replaced by pyrite, which is geologically consistent with the well. The final mineralogy model matches well with core measurements, shown in FIG. 5B.

Figures 6A, 6B, 6C:
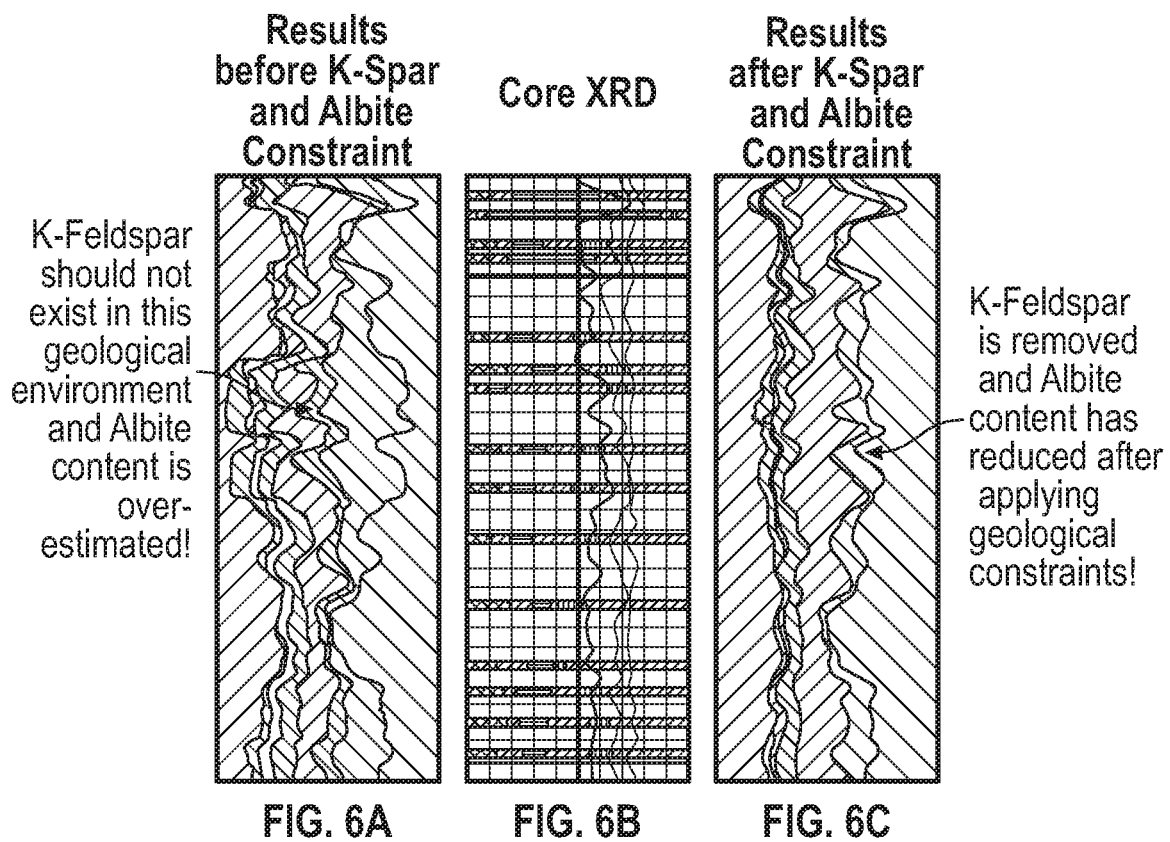
FIGS. 6A & 6C illustrate mineral results before and after applying K-Feldspar/Albite geological constraints for a shale gas well in accordance with embodiments of the present disclosure, respectively.
FIG. 6B illustrates core X-ray diffraction measurements.

FIGS. 6A & 6C illustrate mineral results before and after applying K-Feldspar/Albite geological constraints for a shale gas well in accordance with embodiments of the present disclosure, respectively. In FIG. 6A, potassium feldspar is estimated as a component of the mineralogical composition, and excessive albite content was also found, both of which are not consistent with the environment. In FIG. 6C, after applying the geological constraint of FIG. 4B, K-feldspar is removed and albite content is reduced, which is geologically consistent with the well. The final mineralogy model matches well with core measurements, shown in FIG. 6B.

FIG. 1A, there is illustrated a nuclear well logging configuration in accordance with the present invention. FIG. 1B is a schematic diagram of an exemplary drilling system 100 that includes a drill string having a drilling assembly attached to its bottom end that includes a steering unit according to one embodiment of the disclosure. FIG. 2 illustrates a schematic diagram of an instrument suitable for use with the present invention. FIG. 3 illustrates exemplary components of a logging string of the present disclosure. FIGS. 4A & 4B illustrate probability functions used for constraint in accordance with embodiments of the present disclosure. FIGS. 5A & 5C illustrate mineral results before and after applying Pyrite/Anhydrite geological constraints for a shale gas well in accordance with embodiments of the present disclosure, respectively. The final mineralogy model matches well with core measurements, shown in FIG. 5B.

Figure 7:
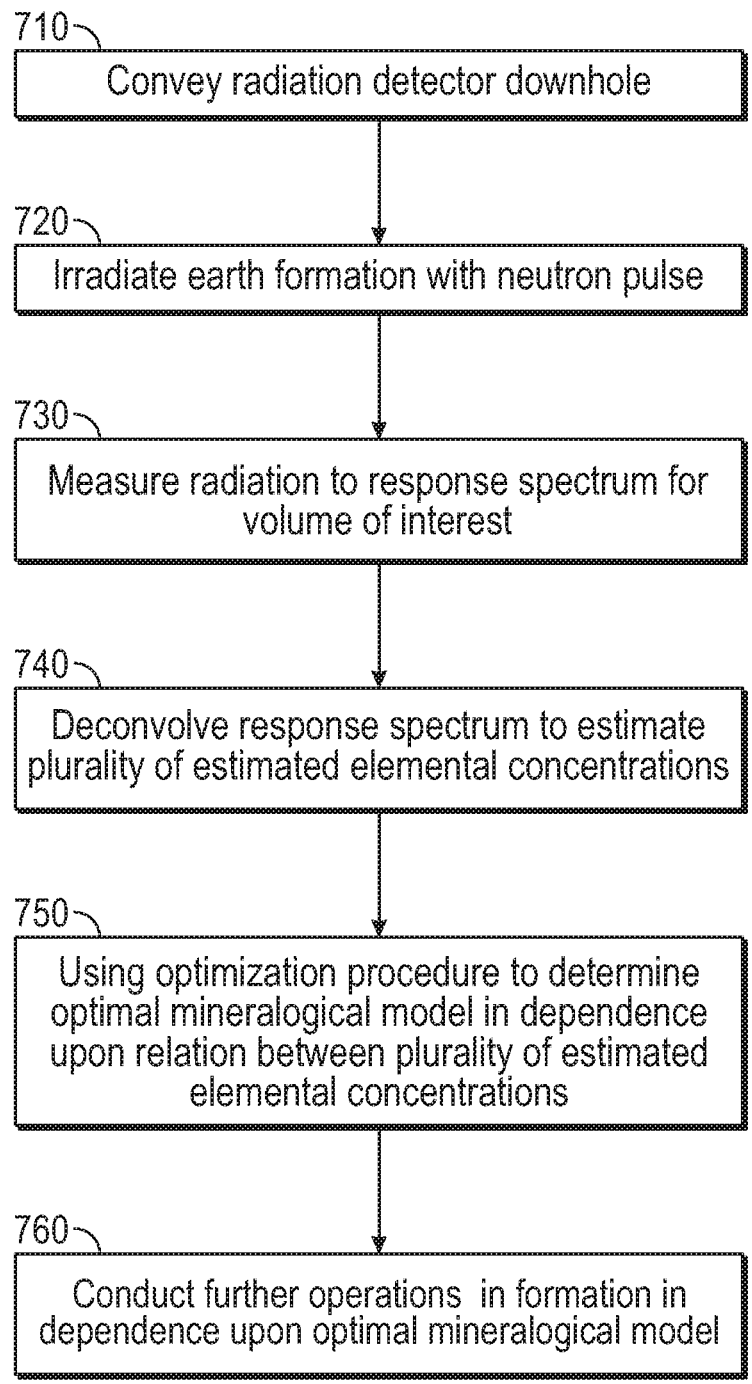
FIG. 7 illustrates methods in accordance with embodiments of the present disclosure.

FIGS. 6A & 6C illustrate mineral results before and after applying K-Feldspar/Albite geological constraints for a shale gas well in accordance with embodiments of the present disclosure, respectively. In FIG. 6C, after applying the geological constraint of FIG. 4B, K-feldspar is removed and albite content is reduced, which is geologically consistent with the well. FIG. 7 illustrates methods in accordance with embodiments of the present disclosure. Optional step 710 of method 700 comprises conveying a radiation detector downhole using a carrier. Optional step 720 comprises irradiating the earth formation with a neutron pulse produced by a pulsed neutron source disposed in the borehole to produce gamma-rays. Optional step 730 comprises measuring radiation responsive to the irradiation to obtain the response spectrum for the volume of interest. Obtaining the response spectrum for the volume of interest may be carried out by making a gamma ray measurement using a gamma ray tool.

Optional step 740 comprises deconvolving a response spectrum to estimate the plurality of estimated elemental concentrations for the volume of interest. Step 750 comprises using an optimization procedure to determine an optimal mineralogical model in dependence upon a relation between a plurality of estimated elemental concentrations for the volume. The mineralogical model may include a mineralogical composition of the volume. The mineralogical composition may include a concentration of each mineral of a plurality of minerals of the volume. The relation may include a ratio of a first elemental concentration of the plurality of estimated elemental concentrations and a second elemental concentration of the plurality of estimated elemental concentrations. The ratio of the first elemental concentration and the second elemental concentration is used to constrain a mineral other than a mineral of the first elemental concentration and the second elemental concentration. Methods may include selecting the optimal mineralogical model from a plurality of candidate models.

Methods may include using at least one cost function to determine the optimal mineralogical model, wherein the at least one cost function is determined using the relation. The at least one cost function may be determined in dependence upon a probability function. The relation may include a ratio between a first concentration of the plurality of estimated elemental concentrations and a second concentration of the plurality of estimated elemental concentrations.

Optional step 760 comprises conducting further operations in the formation in dependence upon the optimal mineralogical model. The further operations may comprise at least one of: i) geosteering; ii) drilling at least one borehole in the formation; iii) performing measurements on the formation; iv) estimating at least one parameter of interest of the formation; v) installing equipment in a borehole in the formation; vi) evaluating the formation; vii) optimizing development in the formation; viii) optimizing development in a formation related to the formation; ix) optimizing exploration in the formation; x) optimizing exploration in a formation related to the formation; xi) producing at least one hydrocarbon from the formation.

In some embodiments, estimation of the parameter of interest may involve applying a model. The model may include, but is not limited to, (i) a mathematical equation, (ii) an algorithm, (iii) an energy spectrum deconvolution technique, (iv) an energy spectrum stripping technique, (v) an energy spectrum window technique, (vi) a time spectrum deconvolution technique, (vii) a time spectrum window technique, or a combination thereof.

Figure 8:
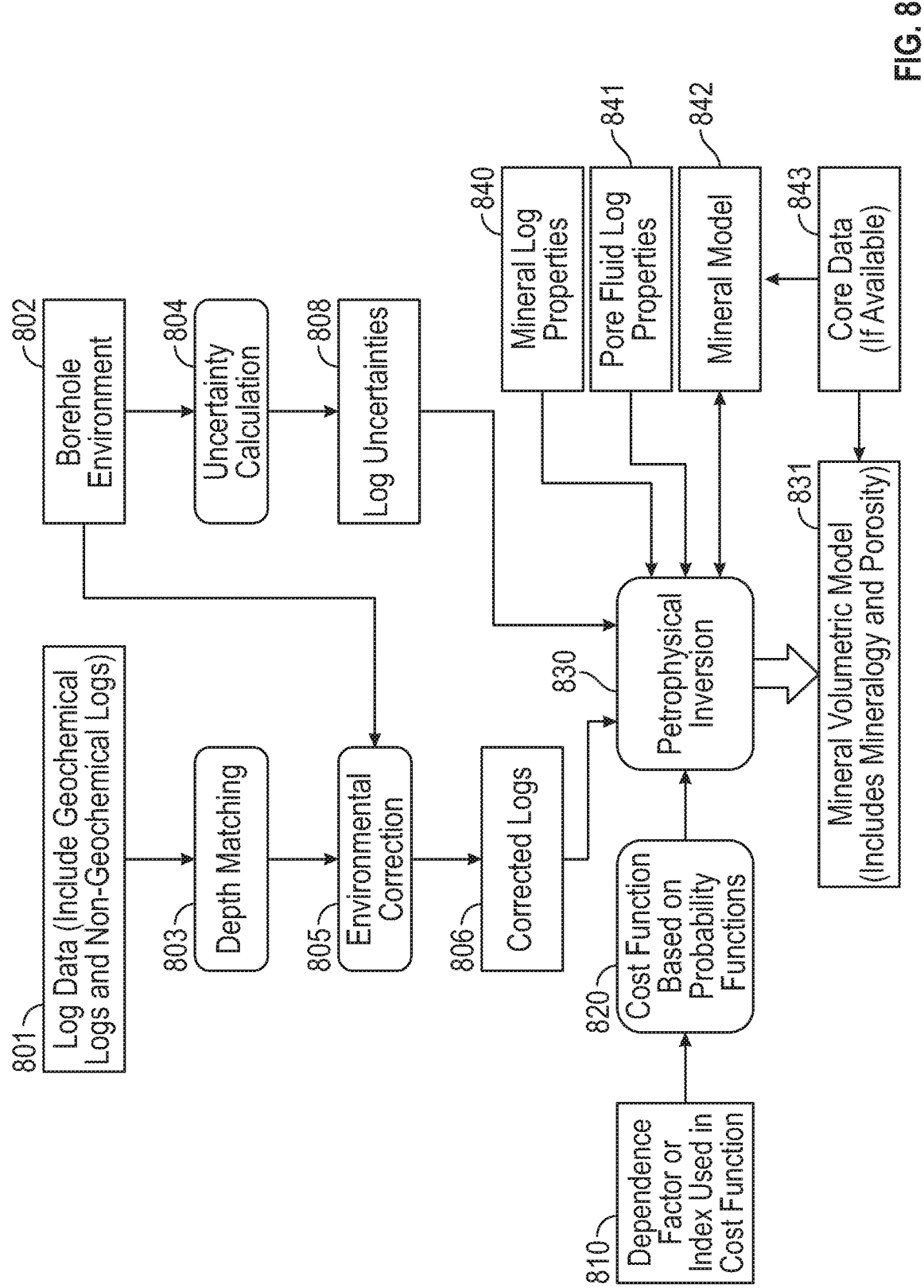
FIG. 8 illustrates data flow in accordance with embodiments of the disclosure.

FIG. 8 illustrates data flow in accordance with embodiments of the disclosure. Log data 801 (e.g., geochemical or non-geochemical logs) is obtained in the borehole. Depth matching 803 is performed and environmental correction 805 is performed using borehole environment information 802 to create corrected logs 806. The borehole environment information 802 may also be used in uncertainty calculations 804, which are used to generate log uncertainties 808.

The corrected logs 806 and log uncertainties 808 are used in a petrophysical inversion 830. Inversion 830 uses mineral log properties 840, pore fluid log properties 841, a mineral model 842, and core data 843. A dependence factor 810 (e.g., index) is used to generate a cost function 820. The cost function 820 influences the inversion 830. The result of inversion 830 is a mineral volumetric model (e.g., including mineralogy and porosity).

Estimated elemental concentrations for a particular volume of the formation and/or models of the formation (or portions thereof) may be stored (recorded) as information or visually depicted on a display. The visual depiction may include a two-dimensional (2D) or three dimensional (3D) graphical depiction of a mineralogical model, such as depiction of mineralogical composition of volumes of the earth formation (although one-dimensional (1D) depictions may also be displayed in some applications). The elemental fraction values or the model of spatial variations in mineralogical composition may be transmitted before or after storage or display, such as, for example, being transmitted uphole (i.e., to the surface or to modules closer to the surface). For example, information may be transmitted to other downhole components, or to the surface for storage, display, or further processing.

Aspects of the present disclosure relate to modeling a volume of an earth formation using radiation information, such as, for example, by associating mineralogy and/or porosity values with portions of the volume of interest to which they correspond, or by representing a boundary between areas of representative or statistically similar values along with the formation in a global coordinate system. Aspects include maintaining a model comprising a representation of the earth formation stored as information including a representation of mineralogy and porosity with respect to location. The model of the earth formation generated and maintained in aspects of the disclosure may be implemented as a representation of the earth formation stored as information, including a graphic representation of mineralogy with respect to location, e.g., in 1D, 2D, or 3D. In one example, a mineral volumetric model of the earth formation may be maintained in a database. Modeling the earth formation may comprise associating a portion of the formation proximate the borehole with a particular concentration of each mineral of a plurality of minerals of the volume as estimated herein, to generate or update the model. The information (e.g., data) may also be transmitted, stored on a non-transitory machine-readable medium, and/or rendered (e.g., visually depicted) on a display. Any of rendering the models, the values, or information representing the same may be referred to herein as "displaying the optimal mineralogical model on a display."

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

In some embodiments, estimation of the parameter of interest may involve applying a model, as described herein above. The model may include, but is not limited to, (i) a mathematical equation, (ii) an algorithm, (iii) a database of associated parameters, (iv) a rule set, (v) a heuristic, (vi) a function, and (vii) other relational techniques, or a combination thereof.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the system generally, may be carried out in a completely automated fashion or through interaction with personnel via notifications, graphical representations, user interfaces and the like. Reference information accessible to the processor may also be used.

Returning to FIG. 1A, certain embodiments of the present disclosure may be implemented with a hardware environment 80 that includes an information processor 81, a information storage medium 83, an input device 85, processor memory 87, and may include peripheral information storage medium 89. The hardware environment 80 may be in the well, at the rig, or at a remote location. Moreover, the several components of the hardware environment may be distributed among those locations. The input device 85 may be any information reader or user input device, such as data card reader, keyboard, USB port, etc. The information storage medium 83 stores information provided by the detectors. Information storage medium 83 may be any standard computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 83 stores a program that when executed causes information processor 81 to execute the disclosed method. Information storage medium 83 may also store the formation information provided by the user, or the formation information may be stored in a peripheral information storage medium 89, which may be any standard computer information storage device, such as a USB drive, memory stick, hard disk, removable RAM, or other commonly used memory storage system known to one of ordinary skill in the art including Internet based storage. Information processor 81 may be any form of computer or mathematical processing hardware, including Internet based hardware. When the program is loaded from information storage medium 83 into processor memory 87 (e.g. computer RAM), the program, when executed, causes information processor 81 to retrieve detector information from either information storage medium 83 or peripheral information storage medium 89 and process the information to estimate a parameter of interest. Information processor 81 may be located on the surface or downhole.

Formation lithology may include formation mineral type, porosity, and fluid in the pore space. Mineralogy may include the chemical composition and structure of minerals in the formation. Herein, "information" may include raw data, processed data, analog signals, and digital signals. The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices (carriers) include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The "correction factor" may be applied in additive (or subtractive) or multiplicative fashion to the radiation information including measurements.

While the foregoing disclosure is directed to the one mode embodiments of the disclosure, various modifications will be apparent to those skilled in the art. It is intended that all variations be embraced by the foregoing disclosure.

What is claimed is:

1. A method for estimating at least one property of a volume of interest of an earth formation from a radiation based measurement, the volume of interest surrounding a borehole intersecting the earth formation, the method comprising:
    obtaining tool measurements from the borehole including a response indicative of radiation detected in the borehole;
    estimating a plurality of estimated elemental concentrations for the volume using the response;
    solving for an optimal mineralogical model comprising apportioning downhole measurement phenomena to candidate minerals by using an optimization procedure to determine the optimal mineralogical model in dependence upon the plurality of estimated elemental concentrations and a secondary dependence relation between the tool measurements, the mineralogical model including a mineralogical composition of the volume, wherein the mineralogical composition comprises a concentration of each mineral of a plurality of minerals of the volume and wherein the secondary dependence relation is indicative of a relative probability between two or more minerals of the candidate minerals, comprising:
        constraining the candidate minerals for a solution in dependence upon the secondary dependence relation; and
    conducting further operations in the formation in dependence upon the optimal mineralogical model.

2. The method of claim 1, wherein the secondary dependence relation comprises a relation between two or more of the plurality of estimated elemental concentrations for the volume.

3. The method of claim 1, wherein the relation comprises a ratio of a first elemental concentration of the plurality of estimated elemental concentrations and a second elemental concentration of the plurality of estimated elemental concentrations.

4. The method of claim 3, wherein the ratio of the first elemental concentration and the second elemental concentration is used to constrain a mineral which lacks both the element of the first elemental concentration and the element of the second elemental concentration.

5. The method of claim 1, comprising selecting the optimal mineralogical model from a plurality of candidate models.

6. The method of claim 1, comprising using at least one cost function to determine the optimal mineralogical model, wherein the at least one cost function is determined using the secondary dependence relation.

7. The method of claim 6, wherein the at least one cost function is determined in dependence upon a probability function.

8. The method of claim 7, wherein the relation comprises a ratio between a first concentration of the plurality of estimated elemental concentrations and a second concentration of the plurality of estimated elemental concentrations.

9. The method of claim 1, comprising deconvolving a response spectrum obtained from the response to estimate the plurality of estimated elemental concentrations for the volume.

10. The method of claim 1, wherein obtaining tool measurements comprises making a gamma ray measurement using a gamma ray tool.

11. The method of claim 1, wherein the further operations comprise at least one of: i) geosteering; ii) drilling at least one borehole in the formation; iii) performing measurements on the formation; iv) estimating at least one parameter of interest of the formation; v) installing equipment in a borehole in the formation; vi) evaluating the formation; vii) optimizing development in the formation; viii) optimizing development in a formation related to the formation; ix) optimizing exploration in the formation; x) optimizing exploration in a formation related to the formation; xi) producing at least one hydrocarbon from the formation.

12. The method of claim 1, comprising displaying the optimal mineralogical model on a display.

13. The method of claim 1, wherein the relative probability is representative of a geological inconsistency of at least one of the two or more minerals of the candidate minerals with the optimal mineralogical model.

14. The method of claim 1, wherein constraining the candidate minerals for the solution comprises constraining the candidate minerals to favor at least one of the two or more minerals of the candidate minerals for the solution and disfavor at least one other of the two or more minerals of the candidate minerals for the solution.

* * * * *